US007136712B2

(12) United States Patent
Mizumura et al.

(10) Patent No.: US 7,136,712 B2
(45) Date of Patent: Nov. 14, 2006

(54) DIGITAL ACOUSTIC REPRODUCING APPARATUS, ACOUSTIC APPARATUS AND ACOUSTIC REPRODUCING SYSTEM

(75) Inventors: Yukari Mizumura, Saitama (JP); Hidetsugu Kubota, Saitama (JP); Toshiyuki Murata, Saitama (JP); Takamasa Yamaguchi, Saitama (JP); Hitoshi Sato, Saitama (JP); Rie Yamashita, Saitama (JP); Hidetoshi Yamaguchi, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/242,763

(22) Filed: Sep. 13, 2002

(65) Prior Publication Data

US 2003/0055517 A1 Mar. 20, 2003

(30) Foreign Application Priority Data

Sep. 20, 2001 (JP) .......................... P2001-286467

(51) Int. Cl.
*G06F 17/00* (2006.01)

(52) U.S. Cl. ............................ 700/94; 381/58; 386/96

(58) Field of Classification Search .................. 386/39, 386/96–107; 369/47.16, 47.2, 53.22, 4; 700/94; 381/58–59, 56, 80–81, 119

See application file for complete search history.

(56) References Cited

U.S. PATENT DOCUMENTS

| | | | | |
|---|---|---|---|---|
| 5,757,928 | A * | 5/1998 | Schaar | 381/22 |
| 5,798,818 | A | 8/1998 | Derderian et al. | 352/31 |
| 6,016,295 | A * | 1/2000 | Endoh et al. | 369/47.16 |
| 6,129,283 | A * | 10/2000 | Imade et al. | 235/494 |
| 6,442,278 | B1 * | 8/2002 | Vaudrey et al. | 381/27 |
| 6,772,024 | B1 * | 8/2004 | Fujii | 700/94 |
| 6,867,820 | B1 * | 3/2005 | Jin | 348/738 |
| 2001/0020193 | A1 * | 9/2001 | Teramachi et al. | 700/94 |
| 2002/0006081 | A1 * | 1/2002 | Fujishita | 369/1 |

FOREIGN PATENT DOCUMENTS

| | | |
|---|---|---|
| JP | 2001 155419 | 6/2001 |
| WO | WO 00/67259 | 11/2000 |

* cited by examiner

*Primary Examiner*—Vivian Chin
*Assistant Examiner*—Lun-See Lao
(74) *Attorney, Agent, or Firm*—Drinker Biddle & Reath LLP

(57) ABSTRACT

In a digital acoustic reproducing apparatus 10 for selecting and outputting one sound information from a sound information source 11 having plural kinds of sound information with at least the number of channels or different data formats, there are provided sound information readout member 12 for reading sound information out of the sound information source 11, information acquisition member 18 for acquiring information about data formats capable of decoding by a decoder 21 to which the sound information read out is supplied or information about the number of speakers 30 to which the sound information decoded by the decoder 21 is supplied, and sound information selection member 14 for selecting sound information to be outputted to the decoder 21 based on the acquired information.

3 Claims, 3 Drawing Sheets

DIGITAL ACOUSTIC REPRODUCING APPARATUS, ACOUSTIC APPARATUS AND ACOUSTIC REPRODUCING SYSTEM

BACKGROUND OF THE INVENTION

The present disclosure relates to the subject matter contained in Japanese Patent Application No. 2001-286467 filed on Sep. 20, 2001, which is incorporated herein by reference in its entirely.

The present invention relates to a digital acoustic reproducing apparatus for selecting and outputting one sound information from a sound information source having plural kinds of sound information, an acoustic apparatus for decoding sound information supplied from the digital acoustic reproducing apparatus and outputting the sound information from a speaker, and an acoustic reproducing system comprising the digital acoustic reproducing apparatus and the acoustic apparatus.

In recent years, a DVD (Digital Versatile Disk) is becoming widespread as a mass storage medium. When a movie is recorded on the DVD, it is constructed so as to record video information or sound information (a maximum of 8 kinds) corresponding to this video information. As the sound information, for example, Dolby digital (Japanese) of 5.1 ch (channel), Dolby digital (Japanese) of 2 ch and Dolby digital (English) of 5.1 ch are considered.

By the way, for example, in addition to a DVD player, a display apparatus for displaying video information outputted from the DVD player, an amplifier for decoding and amplifying sound information outputted from the DVD player and a speaker for outputting the decoded and amplified sound information outputted from the amplifier as sound are used for reproducing such a DVD. Here, for example, a maximum of 8 speakers can be connected to the amplifier.

However, in the case of attempting to reproduce a DVD on which three kinds of sound information, for example, Dolby digital (Japanese) of 5.1 ch, Dolby digital (Japanese) of 2 ch and Dolby digital (English) of 5.1 ch along with video information are recorded, when Japanese is selected as reproduction language in the conventional DVD player, there are cases of selecting improper sound information, in which Dolby digital (Japanese) of 5.1 ch is automatically selected even though only two speakers are connected to the amplifier or Dolby digital (Japanese) of 2 ch is automatically selected even though speakers of the amount of 5.1 ch (six) are connected to the amplifier, and a user was forced to perform operations of switching the sound information by hand every time the selection is made and it was very troublesome.

SUMMARY OF THE INVENTION

The invention is implemented in view of such actual circumstances, and an object of the invention is to provide a digital acoustic reproducing apparatus, an acoustic apparatus and an acoustic reproducing system capable of automatically selecting the optimum sound information from among plural kinds of sound information which a sound information source has.

Firstly, a digital acoustic reproducing apparatus of the invention is characterized in that in a digital acoustic reproducing apparatus for selecting and outputting one sound information from a sound information source having plural kinds of sound information with at least the number of channels or different data formats, there are provided sound information readout member for reading sound information out of the sound information source, information acquisition member for acquiring information about data formats capable of decoding by a decoder to which the sound information read out is supplied or information about the number of speakers to which the sound information decoded by the decoder is supplied, and sound information selection member for selecting sound information to be outputted to the decoder based on the acquired information.

According to the digital acoustic reproducing apparatus thus constructed, the optimum sound information can be automatically selected from among plural kinds of sound information based on the information about data formats capable of decoding by a decoder or the information about the number of speakers.

Secondly, a digital acoustic reproducing apparatus of the invention is characterized in that in the firstly defined digital acoustic reproducing apparatus, the sound information selection member selects sound information to be outputted to the decoder based on a comparison between the number of speakers and the number of channels of sound information which the sound information source has or a comparison between data formats capable of decoding by the decoder and data formats of sound information which the sound information source has.

According to the digital acoustic reproducing apparatus thus constructed, the optimum sound information can be automatically selected from among plural kinds of sound information based on a comparison between the number of speakers and the number of channels of sound information which the sound information source has or a comparison between data formats capable of decoding by the decoder and data formats of sound information which the sound information source has.

Thirdly, an acoustic apparatus of the invention is characterized in that in an acoustic apparatus for decoding sound information supplied from a digital acoustic reproducing apparatus for selecting and outputting one sound information from a sound information source having plural kinds of sound information with at least the number of channels or different data formats and outputting the sound information from a speaker, there are provided a decoder for decoding the sound information, information acquisition member for acquiring information about the number of channels or data formats of sound information which the sound information source has from the digital acoustic reproducing apparatus, and specification signal supply member for supplying a specification signal about sound information to be selected by the digital acoustic reproducing apparatus to the digital acoustic reproducing apparatus based on the acquired information.

According to the acoustic apparatus thus constructed, the optimum sound information can be automatically selected from among plural kinds of sound information based on the information about the number of channels or data formats of sound information which the sound information source has.

Fourthly, an acoustic apparatus of the invention is characterized in that in the thirdly defined acoustic apparatus, the specification signal supply member supplies a specification signal about sound information to be selected by the digital acoustic reproducing apparatus to the digital acoustic reproducing apparatus based on a comparison between the number of speakers and the number of channels of sound information which the sound information source has or a comparison between data formats capable of decoding by the decoder and data formats of sound information which the sound information source has.

According to the acoustic apparatus thus constructed, the optimum sound information can be automatically selected from among plural kinds of sound information based on a comparison between the number of speakers and the number of channels of sound information which the sound information source has or a comparison between data formats capable of decoding by the decoder and data formats of sound information which the sound information source has.

Fifthly, an acoustic reproducing system of the invention is characterized in that in an acoustic reproducing system comprising a digital acoustic reproducing apparatus for outputting sound information from a sound information source having plural kinds of sound information with at least the number of channels or different data formats, and an acoustic apparatus for decoding sound information supplied from the digital acoustic reproducing apparatus by a decoder and outputting the sound information from a speaker, there is provided information acquisition member for acquiring information about the number of speakers and the number of channels of sound information which the sound information source has or information about data formats capable of decoding by the decoder and data formats of sound information which the sound information source has, and sound information to be outputted from the speaker is selected from the sound information source based on the acquired information.

According to the acoustic reproducing system thus constructed, the optimum sound information can be automatically selected from among plural kinds of sound information based on information about the number of speakers and the number of channels of sound information which the sound information source has or information about data formats capable of decoding by the decoder and data formats of sound information which the sound information source has.

Sixthly, a method of the invention is characterized in that in the method including the steps of: selecting one sound information from a sound information source having plural kinds of sound information with at least the number of channels or different data formats, outputting the selected sound information, decoding the selected sound information, acquiring information about the number of channels or data formats of sound information which the sound information source has, and specifying signal about the sound information to be selected based on the acquired information.

DETAILED DESCRIPTION OF THE PREFERRED EMBODIMENTS

One embodiment of the invention will be described below in detail with reference to the drawings. Incidentally, in the embodiment, the invention is applied to a DVD player, an amplifier and an acoustic reproducing system comprising these, respectively.

Figure 1:
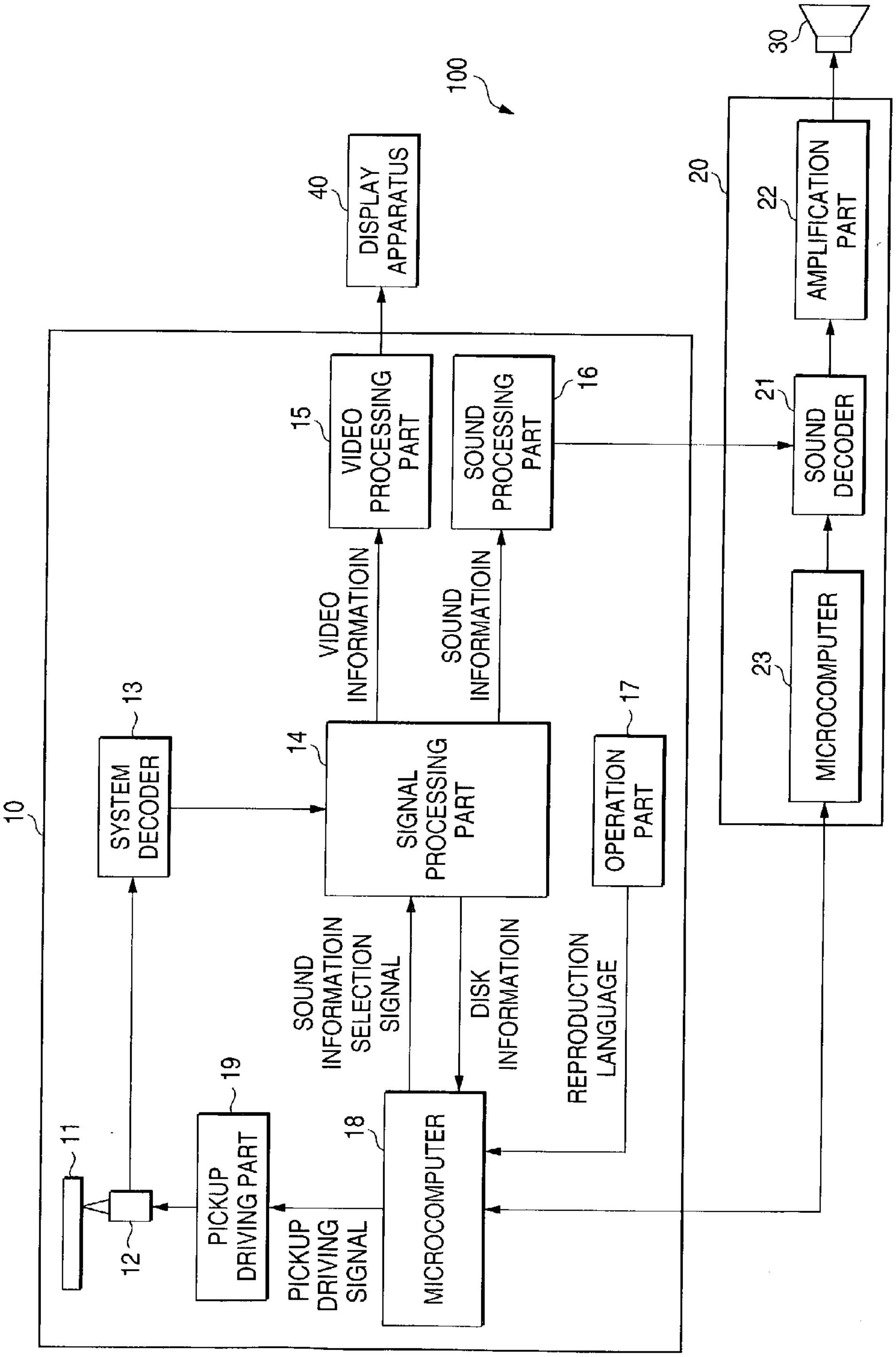
FIG. 1 is a block diagram showing a main configuration of a DVD player, an amplifier and an acoustic reproducing system comprising these in one embodiment of the invention.

FIG. 1 is a block diagram showing a main configuration of a DVD player, an amplifier and an acoustic reproducing system comprising these in the embodiment. In FIG. 1, an acoustic reproducing system 100 comprises a DVD player 10 which is a digital acoustic reproducing apparatus for reproducing a DVD 11 which is a sound information source, and an amplifier 20 which is an acoustic apparatus for decoding and amplifying sound information outputted from the DVD player 10. The acoustic reproducing system 100 further comprises a speaker 30 for outputting the decoded and amplified sound information outputted from the amplifier 20 as sound. Here, for example, a maximum of 8 speakers can be connected to the amplifier 20. Incidentally, a display apparatus 40 for displaying video information outputted from the DVD player 10 is provided.

The DVD player 10 comprises an optical pickup 12 acting as sound information readout member for reading out information recorded on the DVD 11, a system decoder 13 for decoding information read out by the optical pickup 12, a signal processing part 14 acting as sound information selection member for performing predetermined signal processing with respect to information decoded by the system decoder 13 and supplying information (disk information) about the number of channels of plural kinds of sound information, a data format (sound mode) and language recorded on the DVD 11 to a microcomputer 18 described below and selecting and outputting one of the plural kinds of sound information according to a sound information selection signal supplied from the microcomputer 18 and also outputting video information, a video processing part 15 for performing predetermined video signal processing with respect to video information outputted from the signal processing part 14 and supplying the video information to the display apparatus 40, a sound processing part 16 for performing predetermined sound signal processing with respect to sound information outputted from the signal processing part 14 and supplying the sound information to the amplifier 20, an operation part 17 in which a user selects reproduction languages (Japanese/English) and a sound mode recorded on the DVD 11 or provides various operation instructions such as reproduction and stop, a microcomputer 18 acting as information acquisition member comprising a CPU (Central Processing Unit) for acquiring information (information about the number of speakers 30 connected to the amplifier 20 and a data format (sound mode) capable of decoding by a sound decoder 21 of the amplifier 20) supplied from a microcomputer 23 of the amplifier 20 described below in addition to information supplied from the signal processing part 14 and the operation part 17 and determining sound information to be selected based on the acquired information and generating the sound information selection signal in order to select the determined sound information and supplying the signal to the signal processing part 14 and also generating and outputting a pickup driving signal, and a pickup driving part 19 for driving the optical pickup 12 according to the pickup driving signal supplied from the microcomputer 18.

The amplifier 20 comprises a sound decoder 21 for decoding sound information supplied from the sound processing part 16 of the DVD player 10, an amplification part 22 for amplifying the sound information decoded by the sound decoder 21 and supplying the sound information to the speaker 30, and a microcomputer 23 comprising a CPU for controlling the sound decoder 21 and also supplying information (amplifier information) about the number of speakers 30 connected and a data format capable of decoding by the sound decoder 21 to the microcomputer 18 of the DVD player 10. Incidentally, for example, a user selects the presence or absence of the speaker every channel by key operations or automatically detects the presence or absence of the speaker every channel by providing a switch in a speaker terminal (connector) of the amplifier 20 and thereby, the number of speakers 30 can be recognized to the microcomputer 23. Also, the microcomputer 23 shall recognize the data format capable of decoding by the sound decoder 21 from the beginning.

Figure 2:
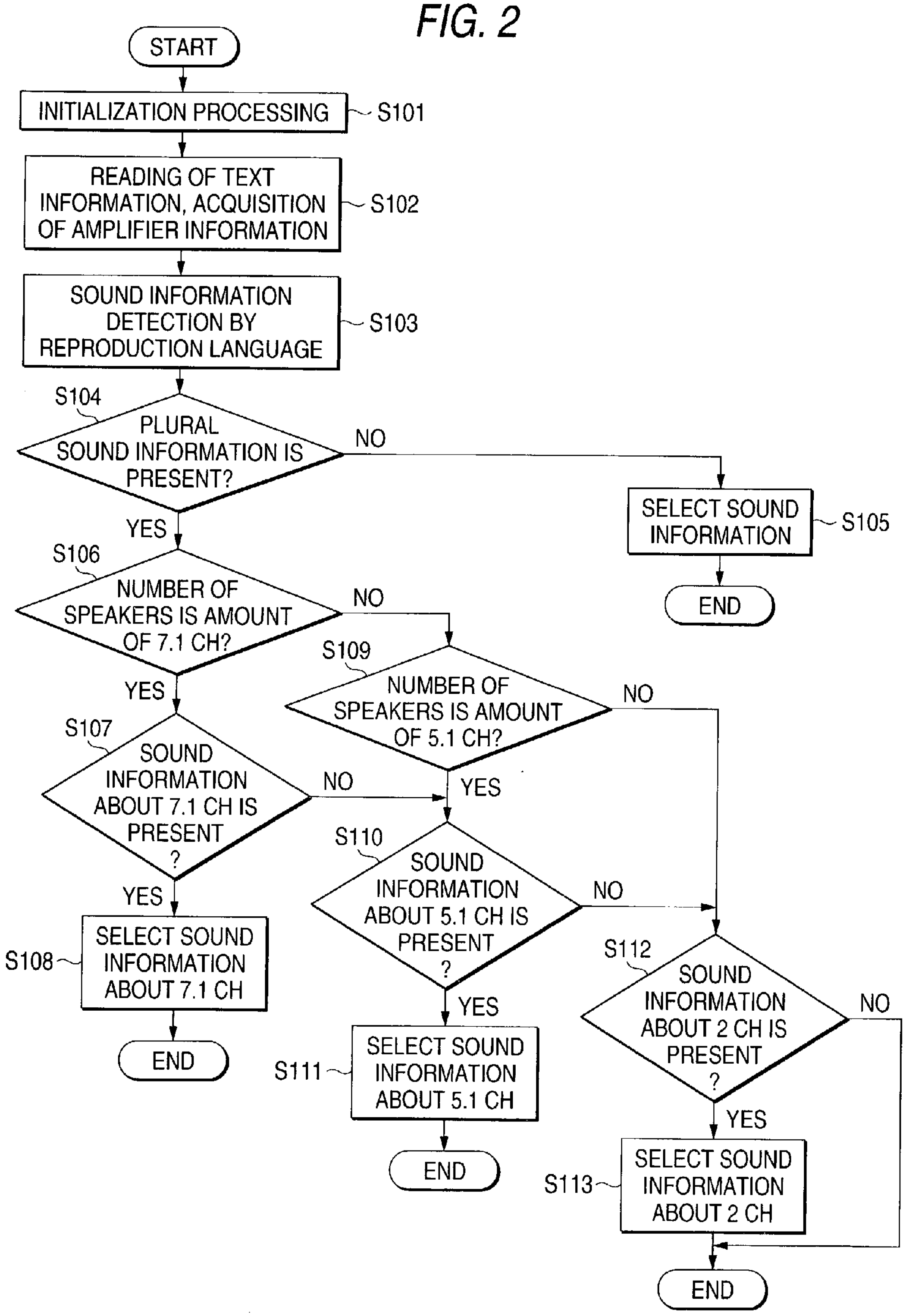
FIG. 2 is a flowchart showing a sound information selection operation in a DVD player of the case of considering only the number of speakers connected to an amplifier and the number of channels of sound information recorded on a DVD.

FIG. 2 is a flowchart showing a sound information selection operation (by the microcomputer 18) in the DVD player 10 of the case of considering only the number of speakers 30 connected to the amplifier 20 and the number of channels of sound information recorded on the DVD 11. Incidentally, in this sound information selection operation, it is constructed so that the sound information with a large number of channels is selected in higher priority.

In FIG. 2, first, initialization processing for initializing information about the previous selection result is performed (step S101). Next, amplifier information is acquired from the microcomputer 23 of the amplifier 20 while reading text information included in navigation information among information recorded on the DVD 11 (step S102). Top menu information, route menu information and text information are included in the navigation information but here, information about the number of channels of every sound information (Number of Audio channels), a data format (Audio coding mode) and language (Specific code extension) among the text information is read. Also, in an operation according to the present flowchart, the amplifier information is information about the number of speakers 30 connected to the amplifier 20. Then, sound information corresponding to reproduction languages (Japanese/English) previously selected using the operation part 17 among sound information recorded on the DVD 11 is detected by a user (step S103). Then, it is determined whether or not plural kinds of sound information have been detected (step S104). When only the one kind of sound information has been detected (N) in step S104, the sound information is selected as sound information to be reproduced (step S105).

On the other hand, when the plural kinds of sound information have been detected (Y) in step S104, it is determined whether or not the number of speakers 30 connected to the amplifier 20 is the amount of 7.1 ch (eight) (step S106). When the number of speakers 30 connected to the amplifier 20 is the amount of 7.1 ch (eight) (Y) in step S106, it is determined whether or not sound information about 7.1 ch is present in the detected sound information (step S107). When the sound information about 7.1 ch is present in the detected sound information (Y) in step S107, the sound information about its 7.1 ch is selected as sound information to be reproduced (step S108).

On the other hand, when the number of speakers 30 connected to the amplifier 20 is less than the amount of 7.1 ch (eight) (N) in step S106, it is determined whether or not the number of speakers 30 connected to the amplifier 20 is the amount of 5.1 ch (six) (step S109). When the number of speakers 30 connected to the amplifier 20 is the amount of 5.1 ch (six) (Y) in step S109 or the sound information about 7.1 ch is absent in the detected sound information (N) in step S107, it is determined whether or not sound information about 5.1 ch is present in the detected sound information (step S110). When the sound information about 5.1 ch is present in the detected sound information (Y) in step S110, the sound information about its 5.1 ch is selected as sound information to be reproduced (step S111).

On the other hand, when the number of speakers 30 connected to the amplifier 20 is less than the amount of 5.1 ch (six) (N) in step S109 or the sound information about 5.1 ch is absent in the detected sound information (N) in step S110, it is determined whether or not sound information about 2 ch is present in the detected sound information (step S112). When the sound information about 2 ch is present in the detected sound information (Y) in step S112, the sound information about its 2 ch is selected as sound information to be reproduced (step S113).

On the other hand, when the sound information about 2 ch is absent in the detected sound information (N) in step S112, the processing is ended. Incidentally, in this case, it may be constructed so as to select some sound information forcedly regardless of the number of speakers 30 connected to the amplifier 20.

According to the sound information selection operation thus shown in FIG. 2, the number of speakers 30 connected to the amplifier 20 is compared with the number of channels of sound information recorded on the DVD 11 and the optimum sound information can be selected automatically. Incidentally, the reason why the sound information with a large number of channels is selected in higher priority is because reproduction with reality feeling can be performed as the number of channels (the number of speakers) increases generally. Also, the number of speakers 30 and the number of channels of sound information are not limited to the numeric value described above.

Figure 3:
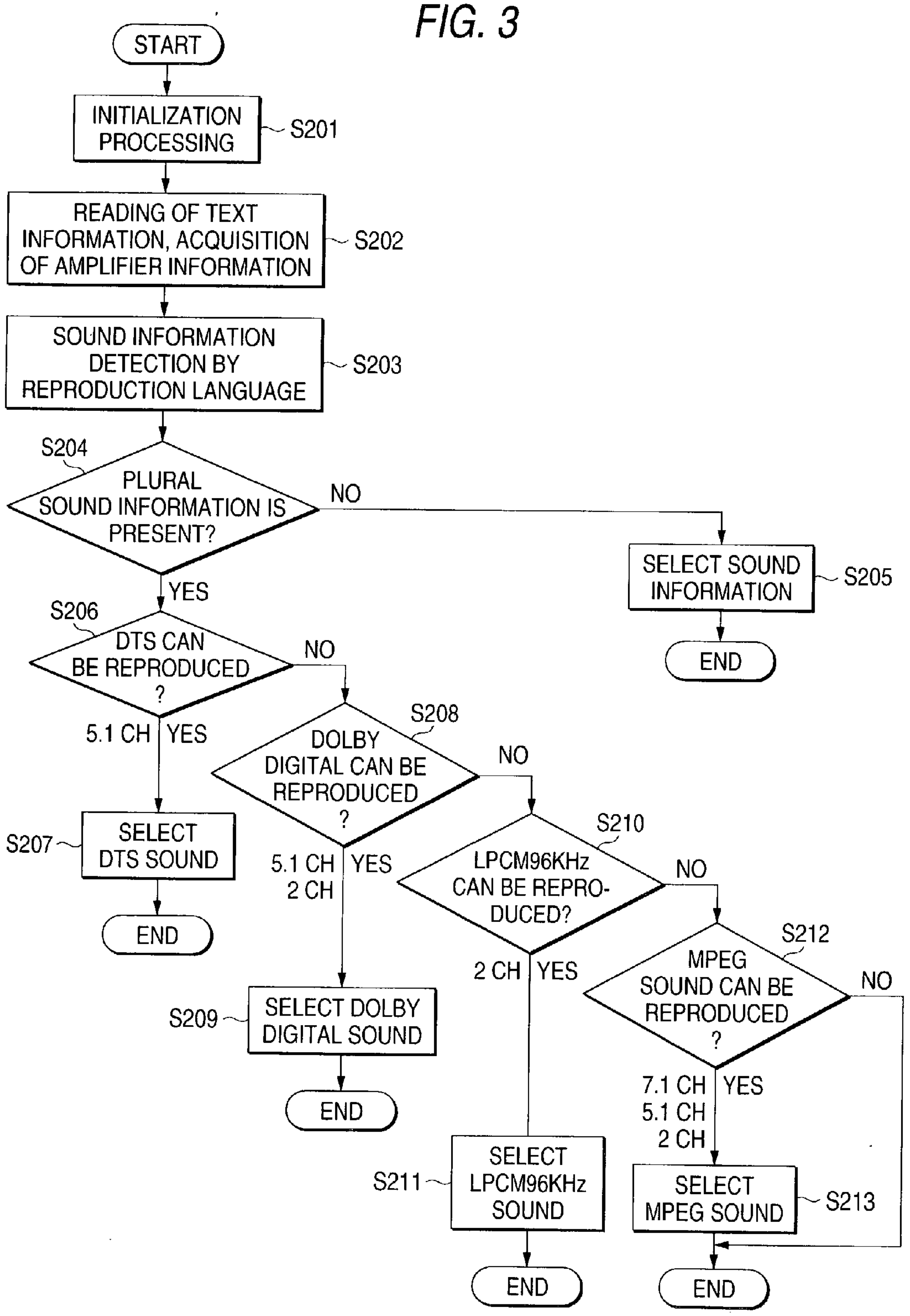
FIG. 3 is a flowchart showing a sound information selection operation in a DVD player of the case of considering the number of speakers connected to an amplifier and a data format capable of decoding by a sound decoder, and the number of channels of sound information and a data format recorded on a DVD.

FIG. 3 is a flowchart showing a sound information selection operation (by the microcomputer 18) in the DVD player 10 of the case of considering the number of speakers 30 connected to the amplifier 20 and a data format capable of decoding by the sound decoder 21, and the number of channels of sound information and a data format recorded on the DVD 11. Here, four kinds of data formats of DTS, Dolby digital, linear PCM (Pulse Code Modulation) 96 KHz, MPEG (Moving Picture Experts Group) sound are considered as the data format. Incidentally, in this sound information selection operation, it is constructed so that sound information is selected according to priority of the data formats preset by a user.

In FIG. 3, first, initialization processing for initializing information about the previous selection result is performed (step S201). Next, amplifier information is acquired from the microcomputer 23 of the amplifier 20 while reading text information included in navigation information among information recorded on the DVD 11 (step S202). Top menu information, route menu information and text information are included in the navigation information but here, information about the number of channels of every sound information (Number of Audio channels), a data format (Audio coding mode) and language (Specific code extension) among the text information is read. Also, in an operation according to the present flowchart, the amplifier information is information about the number of speakers 30 connected to the amplifier 20 and a data format capable of decoding by the sound decoder 21 of the amplifier 20. Then, sound information corresponding to reproduction languages (Japanese/English) previously selected using the operation part 17 among sound information recorded on the DVD 11 is detected by a user (step S203). Then, it is determined whether or not plural kinds of sound information have been detected (step S204). When only the one kind of sound information has been detected (N) in step S204, the sound information is selected as sound information to be reproduced (step S205).

On the other hand, when the plural kinds of sound information have been detected (Y) in step S204, it is determined whether or not sound information by DTS of 5.1 ch can be reproduced (step S206). That is, while determining whether or not sound information by the DTS of 5.1 ch is present in the detected sound information (whether or not sound information by the DTS of 5.1 ch has been recorded on the DVD 11), it is determined whether or not the amplifier 20 can reproduce the sound information by the DTS of 5.1 ch. Here, whether or not the amplifier 20 can reproduce the sound information by the DTS of 5.1 ch is determined by whether or not the number of speakers 30 connected to the amplifier 20 is the amount of 5.1 ch (six) and the sound decoder 21 of the amplifier 20 has decoding ability of the sound information by the DTS based on the amplifier information. When the sound information by the DTS of 5.1 ch has been recorded on the DVD 11 and the amplifier 20 can reproduce the sound information by the DTS of 5.1 ch (Y) in step S206, the sound information by the DTS of 5.1 ch is selected as sound information to be reproduced (step S207).

On the other hand, in the case other than the case described above (N) in step S206, it is determined whether or not sound information by Dolby digital of 5.1 ch can be reproduced (step S208). That is, while determining whether or not sound information by the Dolby digital of 5.1 ch is present in the detected sound information (whether or not sound information by the Dolby digital of 5.1 ch has been recorded on the DVD 11), it is determined whether or not the amplifier 20 can reproduce the sound information by the Dolby digital of 5.1 ch. Here, whether or not the amplifier 20 can reproduce the sound information by the Dolby digital of 5.1 ch is determined by whether or not the number of speakers 30 connected to the amplifier 20 is the amount of 5.1 ch (six) and the sound decoder 21 of the amplifier 20 has decoding ability of the sound information by the Dolby digital based on the amplifier information. When the sound information by the Dolby digital of 5.1 ch has been recorded on the DVD 11 and the amplifier 20 can reproduce the sound information by the Dolby digital of 5.1 ch (Y) in step S208, the sound information by the Dolby digital of 5.1 ch is selected as sound information to be reproduced (step S209). Incidentally, it is simultaneously determined whether or not sound information by Dolby digital of 2 ch can be reproduced in step S208. That is, when the sound information by the Dolby digital of 2 ch can be reproduced even in the case that the sound information by the Dolby digital of 5.1 ch cannot be reproduced, it is constructed so that the sound information by the Dolby digital of 2 ch is selected as sound information to be reproduced. Also, when both of the sound information by the Dolby digital of 5.1 ch and the sound information by the Dolby digital of 2 ch can be reproduced, it is constructed so that the sound information by the Dolby digital of 5.1 ch capable of performing reproduction with more reality feeling is selected in higher priority as sound information to be reproduced.

On the other hand, in the case other than the case described above (N) in step S208, it is determined whether or not sound information by linear PCM96 KHz of 2 ch can be reproduced (step S210). That is, while determining whether or not sound information by the linear PCM96 KHz of 2 ch is present in the detected sound information (whether or not sound information by the linear PCM96 KHz of 2 ch has been recorded on the DVD 11), it is determined whether or not the amplifier 20 can reproduce the sound information by the linear PCM96 KHz of 2 ch. Here, whether or not the amplifier 20 can reproduce the sound information by the linear PCM96 KHz of 2 ch is determined by whether or not the number of speakers 30 connected to the amplifier 20 is the amount of 2 ch (two) and the sound decoder 21 of the amplifier 20 has decoding ability of the sound information by the linear PCM96 KHz based on the amplifier information. When the sound information by the linear PCM96 KHz of 2 ch has been recorded on the DVD 11 and the amplifier 20 can reproduce the sound information by the linear PCM96 KHz of 2ch (Y) in step S210, the sound information by the linear PCM96 KHz of 2 ch is selected as sound information to be reproduced (step S211).

On the other hand, in the case other than the case described above (N) in step S210, it is determined whether or not sound information by MPEG sound of 7.1 ch can be reproduced (step S212). That is, while determining whether or not sound information by the MPEG sound of 7.1 ch is present in the detected sound information (whether or not sound information by the MPEG sound of 7.1 ch has been recorded on the DVD 11), it is determined whether or not the amplifier 20 can reproduce the sound information by the MPEG sound of 7.1 ch. Here, whether or not the amplifier 20 can reproduce the sound information by the MPEG sound of 7.1 ch is determined by whether or not the number of speakers 30 connected to the amplifier 20 is the amount of 7.1 ch (eight) and the sound decoder 21 of the amplifier 20 has decoding ability of the sound information by the MPEG sound based on the amplifier information. When the sound information by the MPEG sound of 7.1 ch has been recorded on the DVD 11 and the amplifier 20 can reproduce the sound information by the MPEG sound of 7.1 ch (Y) in step S212, the sound information by the MPEG sound of 7.1 ch is selected as sound information to be reproduced (step S213). Incidentally, it is simultaneously determined whether or not sound information by MPEG sound of 5.1 ch and 2 ch can be reproduced in step S212. That is, when the sound information by the MPEG sound of 5.1 ch can be reproduced even in the case that the sound information by the MPEG sound of 7.1 ch cannot be reproduced, it is constructed so that the sound information by the MPEG sound of 5.1 ch is selected as sound information to be reproduced. Similarly, when the sound information by the MPEG sound of 2 ch can be reproduced even in the case that both of the sound information by the MPEG sound of 7.1 ch and the sound information by the MPEG sound of 5.1 ch cannot be reproduced, it is constructed so that the sound information by the MPEG sound of 2 ch is selected as sound information to be reproduced. Also, when all of the sound information by the MPEG sound of 7.1 ch, 5.1 ch and 2 ch can be reproduced, it is constructed so that the sound information by the MPEG sound of 7.1 ch capable of performing reproduction with more reality feeling is selected in higher priority as sound information to be reproduced.

On the other hand, in the case other than the case described above (N) in step S212, the processing is ended. Incidentally, in this case, it may be constructed so as to forcedly select some sound information capable of decoding by the amplifier 20 regardless of the number of speakers 30 connected to the amplifier 20.

According to the sound information selection operation thus shown in FIG. 3, it is constructed so that the sound information to be reproduced is selected by a comparison between the data format of sound information recorded on the DVD 11 and the data format capable of decoding by the sound decoder 21 of the amplifier 20 in addition to a comparison between the number of channels of sound information recorded on the DVD 11 and the number (the number of channels) of speakers 30 connected to the amplifier 20. Therefore, the optimum sound information can be selected automatically in consideration of both the number of channels and the data format. Incidentally, priority of the data format is set in order of DTS, Dolby digital, linear PCM96 KHz, MPEG sound but, a user can change this setting arbitrarily. Also, kinds of the data formats and the number of channels are not limited to those described above. Further, it may be determined whether or not the sound information by each data format can be reproduced in consideration of only the data format without considering the number of channels.

Also, in the embodiment described above, the microcomputer 18 of the DVD player 10 is caused to perform control for the sound information selection operation, but the microcomputer 23 of the amplifier 20 may be caused to perform the control. In this case, it may be constructed so that information about the number of channels of plural kinds of sound information and the data format recorded on the DVD 11 is supplied from the microcomputer 18 of the DVD player 10 to the microcomputer 23 of the amplifier 20 acting as information acquisition member and also based on a comparison between the number of speakers 30 connected to the amplifier 20 and the number of channels of sound information recorded on the DVD 11 or a comparison between the data format capable of decoding by the sound decoder 21 of the amplifier 20 and the data format of sound information recorded on the DVD 11, a specification signal for specifying sound information to be selected by the DVD player 10 is supplied from the microcomputer 23 acting as specification signal supply member to the microcomputer 18 of the DVD player 10.

Further, the invention is not limited to an apparatus or a system using a DVD as a sound information source, and can also be applied to, for example, an apparatus or a system using digital broadcast waves or an HDD (Hard Disk Drive).

As is evident from the description, according to the invention, the optimum sound information can be automatically selected from among plural kinds of sound information which a sound information-source has.

What is claimed is:

1. A digital acoustic reproducing apparatus for selecting and outputting one sound information from a sound information source having plural kinds of sound information with at least a different number of channels, comprising:

sound information readout member for reading sound information out of the sound information source;

information acquisition member for acquiring information about the number of speakers to which the read out sound information is supplied; and sound information selection member for selecting the sound information based on the acquired information before reproduction, wherein if there is no sound information having the number of channels corresponding to the number of speakers, the sound information selection member selects a sound information having a channel number less than the number of the channels corresponding to the number of the speakers.

2. An acoustic apparatus for decoding one sound information supplied from a digital acoustic reproducing apparatus for selecting and outputting the sound information from a sound information source having plural kinds of sound information with at least a different number of channels or data formats and outputting the sound information from a speaker, comprising:

a decoder for decoding the sound information;

information acquisition member for acquiring information about the number of channels of the sound information which the sound information source has from the digital acoustic reproducing apparatus; and specification signal supply member for supplying a specification signal about sound information to be selected by the digital acoustic reproducing apparatus to the digital acoustic reproducing apparatus based on the acquired information before reproduction, wherein the specification signal supply member compares the number of speakers and the number of channels, and if the number of speakers and the number of channels do not correspond to each other, the specification signal supply member supplies a specification signal about sound information with a channel number smaller than the number of channels to the digital acoustic reproducing apparatus.

3. An acoustic reproducing system comprising:

a digital acoustic reproducing apparatus for outputting a sound information from a sound information source having plural kinds of sound information with at least a different number of channels or data formats; and an acoustic apparatus for decoding a sound information supplied from the digital acoustic reproducing apparatus and outputting from a speaker, wherein the acoustic apparatus supplies information about the number of speakers or data formats capable of decoding by a decoder to the digital acoustic reproducing apparatus, and the digital acoustic reproducing apparatus compares the number of speakers and the number of channels which the sound information source has, and if the number of channels and the number of speakers do not correspond to each other, a sound information having a channel number smaller than the number of channels is selected, or compares a data format to be decoded by the decoder and a data format of a sound information which the sound information source has, and if there are plural channels to a common data format, selects a sound information having a larger number of channels from the sound information source before reproduction.

* * * * *